United States Patent Office 3,078,401
Patented Feb. 19, 1963

3,078,401
BIASED SYNCHRO CONTROL ALL ATTITUDE
PITCH INDICATOR
William A. Molander, Jr., Montville, and Oscar Edelman, Nutley, N.J., assignors to General Precision Inc., Little Falls, N.J., a corporation of Delaware
Filed Dec. 28, 1960, Ser. No. 78,934
6 Claims. (Cl. 318—30)

This invention relates to a novel means for biasing the pitch axis output of an aircraft pitch axis measuring means to overcome unbalanced loading of the aircraft.

Aircraft such as fighter aircraft are provided with an all attitude indicator which delivers output information, for example, of the variation of the pitch axis, roll axis and yaw axis of the aircraft from their zero position. This information is used for driving visual presentation means of the attitude of the aircraft, or to operate automatic control elements.

When an aircraft has an unbalanced load, during level flight, its pitch will not be zero. It has been attempted to provide a constant correction for the pitch indication due to the unbalanced loading, but this is not acceptable since it gives incorrect information for all attitudes other than level flight. That is to say, when there is unbalanced loading the pitch error is not constant for all attitudes. We have found that when a correction is made which varies as a cosine of the pitch angle that there will be very close correction of the pitch angle reading for all attitudes of the aircraft. Accordingly, we provide signal means which inserts a biasing signal having maxima at zero degrees of pitch and 180° of pitch, and is substantially zero at 90° of pitch and 270° of pitch. In the application of the invention pitch angles are generally sensed by gyroscopic means which vary the relative position of the rotor and stator of a control transmitter. This causes a similar displacement between the rotor and stator of a control transformer which is driven by the control transmitter aforementioned to deliver an electrical signal for driving an indicating means or an automatic correction means such as an autopilot where the stator windings of the control transformer and the control transmitter are interconnected in the usual manner.

We utilize the current flow in the circuit connection between one of the stator windings of the control transmitter and the corresponding stator winding of the control transformer which current varies with the cosine of the pitch angle. Accordingly, by putting a resistor in this circuit connection the voltage drop across the resistance in the circuit also varies with the cosine of the pitch angle and this can then be used as a correction signal which is applied in the output circuit of the control transformer which is connected to the utilization means such as an indicator or autopilot. If desired, this output voltage can be applied to the stator windings of a further control transmitter which will serve as an amplifier with the rotor of this further control transmitter being connected in the output circuit to the utilization means.

Accordingly, a primary object of our invention is to provide biasing means for a pitch axis indicator output which gives a proper correction for all attitudes of the aircraft.

Another object of this invention is to provide a novel compensating means for pitch axis output indicators which compensates for unbalanced loading of an aircraft.

A further object of this invention is to provide a novel sinusoidal biasing signal for synchro systems.

A further object of this invention is to utilize the stator current of a synchro system to generate a sinusoidal correction signal for the output of the synchro system.

These and other objects of this invention will be apparent from the following description when taken in connection with the drawings in which:

FIGURE 1 schematically illustrates a synchro servo system having a corrected pitch angle indication delivered to a servo indicator for correcting for unbalanced loading of an aircraft.

Figure 1:
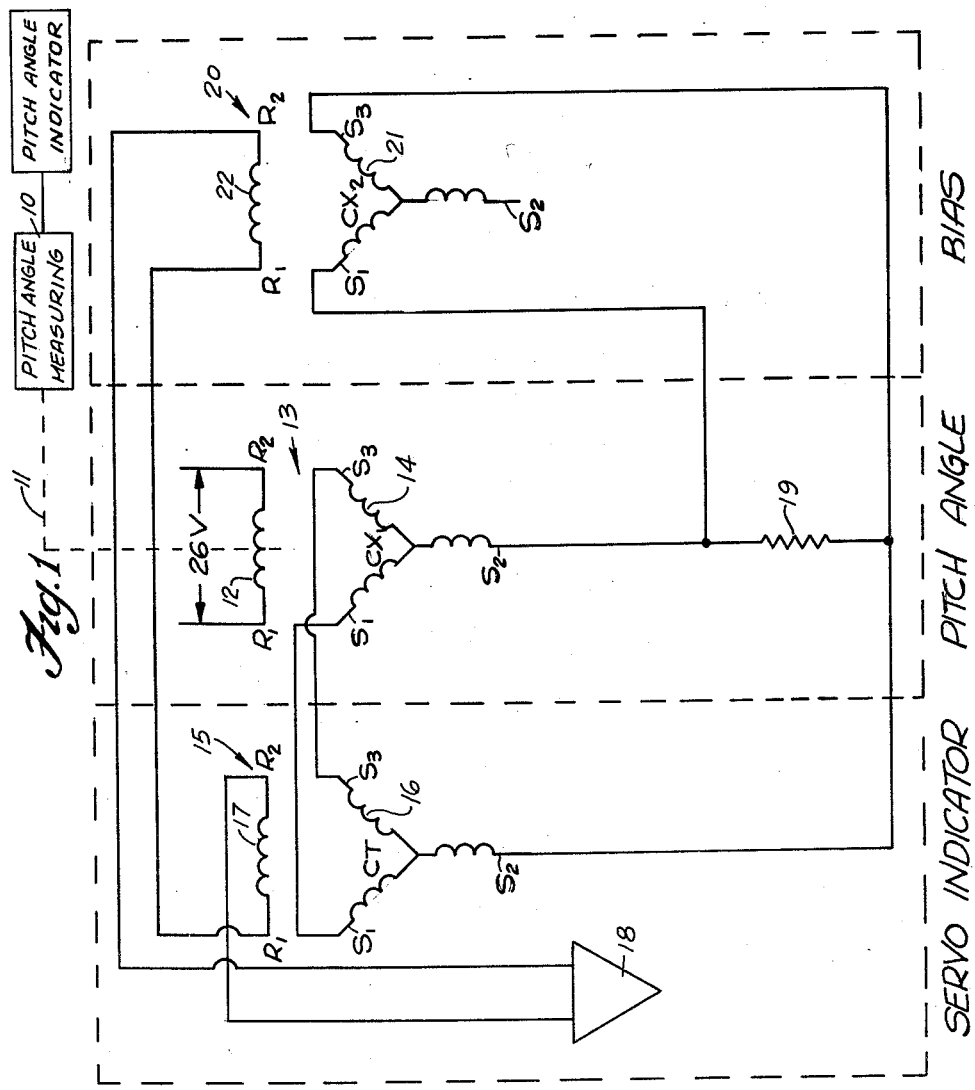

Referring now to FIGURE 1, we have schematically illustrated a pitch angle measuring means 10 which could, for example, be a typical gyroscopic measuring device which will deliver a mechanical output equal to the deviation of the pitch of the aircraft from zero. The mechanical output of device 10 indicated by dotted lines 11 is then connected to the rotor 12 of a control transmitter 13. Control transmitter 13 is in the pitch angle sensing portion of the system as indicated by the labeled dotted block and has a stator winding 14 having three windings S1, S2, and S3. An input A.-C. voltage of, for example, 26 volts may be applied to terminals R1 and R2 for rotor winding 12, where control transmitter 13 is of the type RS 901–1 control transmitter manufactured by the Kearfott Division of General Precision, Inc. the assignee of the present application.

The servo indicator portion of the system of FIGURE 1 then includes a control transformer 15 which could be of the type RS 911–3 control transformer manufactured by the Kearfott Division of General Precision Inc. having stator windings 16 which has leads S1, S2 and S3 and a rotor winding 17 having terminals R1 and R2. The output of rotor winding 17, as will be seen more fully hereinafter, is connected in series with an amplifier schematically shown as amplifier 18 which is subsequently connected to some type of utilization means such as an autopilot or indicator (not shown).

In accordance with the present invention and as will be discussed more fully hereinafter, the circuit connection between leads S2 of stator windings 14 and 16 have a resistor 19 connected therein which could, for example, have a value of 70 ohms.

The bias portion of the system is contained within the dotted block at the right hand portion of FIGURE 1 and includes control transmitter 20 having a stator winding 21 which has leads S1, S2 and S3 and a rotor winding 22 having terminals R1 and R2. Control transmitter 20 may be of the type RS 901–1 manufactured by the Kearfott Division of General Precision, Inc. The purpose of control transmitter 20, as will be seen more fully hereinafter, is to adjust a transformation ratio of the voltage applied to rotor 22 with respect to the voltage drop on resistor 19 and amplify the correction signal. The leads S1 and S3 of control transmitter 20 are connected across resistor 19 as shown. The output of control transmitter 20 appearing at terminals R1 and R2 of rotor 22 is then connected in series with terminals R1 and R2 of rotor 17 and thence with amplifier 18.

In operation and when the aircraft assumes a given pitch angle, measuring means 10 rotates rotor 12 of control transmitter 13 through this same pitch angle.

The connections between stator windings 14 and 16 then cause rotor 17 to assume the same alignment given to rotor 12 whereby for all positive pitch angles the output voltage on rotor winding 17 is in phase with the voltage applied to rotor winding 12 and has a magnitude dependent upon the pitch angle. When rotor winding 12 is rotated through zero and to a negative angle the phase of the output voltage on rotor 17 changes in the usual manner, the magnitude of the output signal being dependent upon the angle assumed by rotor 12. Accordingly, the signal applied to amplifier 18 will have a magnitude depending upon the absolute value of the angle through which rotor 12 is moved and the sense of the signal will be determined by the phase of the output voltage with respect to the phase of the input voltage to the rotor winding 12.

As indicated above, where such a pitch angle measuring system is used in aircraft, when the aircraft loading is unbalanced, a pitch angle depending upon the unbalance, will be read during level flight. Moreover, as the attitude of the aircraft changes, the error in measured pitch angle will vary, and specifically will vary with the cosine of the pitch angle.

In accordance with the present invention and taking advantage of the fact that the current in the circuit connection between lead S2 of stator windings 14 and 16 varies with the cosine of the angle assumed by rotor 12, we place a resistor 19 in this circuit connection whereby the voltage drop across the resistor will similarly vary with the cosine of the pitch angle. In order to amplify the correction signal and adjust the transformation ratio, we first apply the correction signal across resistor 19 to leads S1 and S3 of auxiliary control transformer 20. By then rotating rotor 22 of control transformer 20 we can set the level of the voltage induced in stator winding 22 to some predetermined value. This signal across stator winding 22 is then combined with the signal across stator winding 17 and the combined and corrected signal is then applied to amplifier 18 which delivers power to various utilization circuits.

In a first application of the circuit shown in FIGURE 1 the value of resistor 19 was 70 ohms and control transmitter 22 was adjusted for zero bias amplification. A bias correction in degrees, as a function of degrees of input pitch, was found as shown in curve 30. As seen in curve 30, the bias at 90 degrees is determined as zero while at zero degrees the bias or correction angle is that required for predetermined unbalanced loading during level flight.

Figure 2:
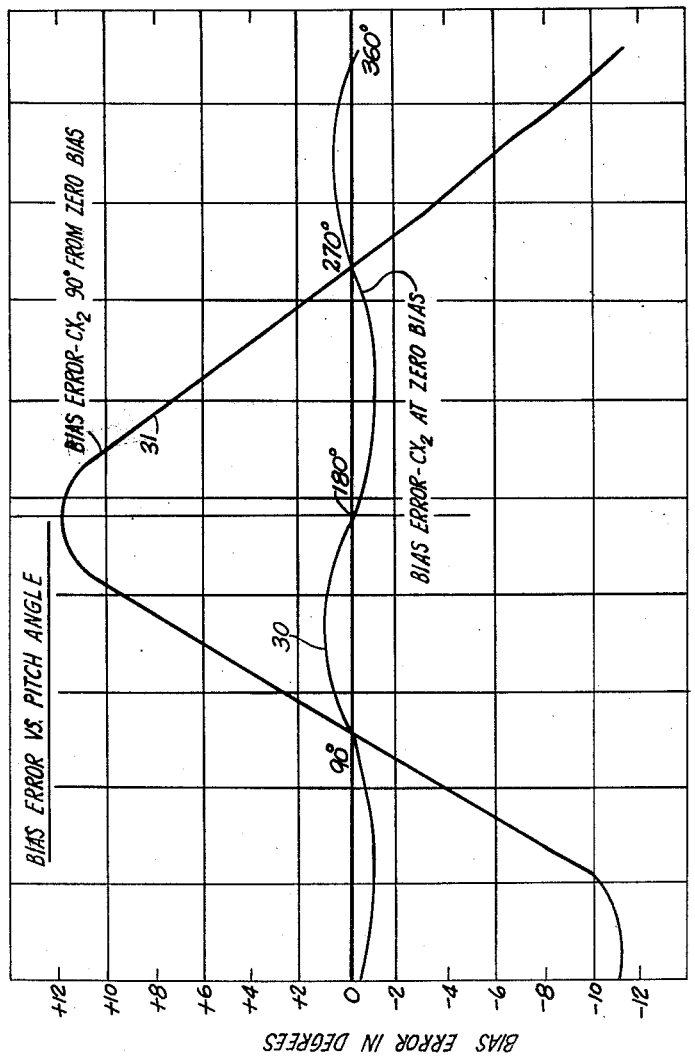
FIGURE 2 illustrates the biasing signal in the degrees of correction of pitch as a function of degrees of measured pitch for both zero signal amplification and for signal amplification phase shifted 90° from a null position.

The following represent the test results, on which the curve 30 shown in FIGURE 2 was based.

| Output pitch angle to rotor 12 (degrees) | Correction angle (degrees) | Voltage drop across 7Ω resistance in S2 of control transmitter 13 | Voltage drop across R₁–R₂ of control transmitter 20 |
|---|---|---|---|
| 0 | .22 | −.28 | .11 |
| 15 | .58 | −.28 | .11 |
| 30 | .80 | −.24 | .13 |
| 45 | .88 | −.20 | .16 |
| 60 | .77 | −.14 | .15 |
| 75 | .40 | −.07 | .17 |
| 90 | .33 | +.0048 | .17 |
| 105 | .50 | +.078 | .19 |
| 120 | .82 | +.15 | .20 |
| 135 | 1.00 | +.21 | .22 |
| 150 | .95 | +.25 | .23 |
| 165 | .66 | +.28 | .27 |
| 180 | .22 | +.29 | .28 |
| 195 | .22 | +.28 | .28 |
| 210 | .53 | +.24 | .28 |
| 225 | .65 | +.20 | .27 |
| 240 | .60 | +.14 | .25 |
| 255 | .37 | +.072 | .22 |
| 270 | 0 | −.0036 | .20 |
| 285 | .40 | −.078 | .20 |
| 300 | .63 | −.14 | .18 |
| 315 | .66 | −.21 | .17 |
| 330 | .62 | −.25 | .16 |
| 345 | .27 | −.28 | .16 |

The following represent the test results on which the curve 31, shown in FIGURE 2, was based.

| Output pitch angle to rotor 12 (degrees) | Correction angle (degrees) | Voltage drop across 70Ω resistance in S2 of control transmitter 13 | Voltage drop across R₁–R₂ of control transmitter 20 |
|---|---|---|---|
| 0 | 11.1 | 3.63 | 3.4 |
| 15 | 11.3 | −.60 | 3.3 |
| 30 | 10.8 | −.53 | 2.3 |
| 45 | 9.0 | −.42 | 2.3 |
| 60 | 5.4 | −.28 | 1.6 |
| 75 | 2.9 | −.33 | .74 |
| 90 | 0 | +.022 | .16 |
| 105 | 3.2 | +.18 | 1.1 |
| 120 | 6.7 | +.33 | 1.8 |
| 135 | 9.6 | +.46 | 2.6 |
| 150 | 11.4 | +.58 | 3.2 |
| 165 | 12.0 | +.64 | 3.6 |
| 180 | 11.3 | +.67 | 3.7 |
| 195 | 9.7 | +.64 | 3.6 |
| 210 | 7.4 | +.58 | 3.2 |
| 225 | 4.9 | +.47 | 2.6 |
| 240 | 2.6 | +.34 | 1.8 |
| 255 | 1.0 | +.17 | 1.0 |
| 270 | 0.3 | +.0016 | .073 |
| 285 | 1.7 | −.16 | .86 |
| 300 | 3.2 | −.32 | 1.80 |
| 315 | 5.3 | −.44 | 2.5 |
| 330 | 7.4 | −.56 | 3.0 |
| 345 | 9.5 | −.62 | 3.4 |

Figure 3:
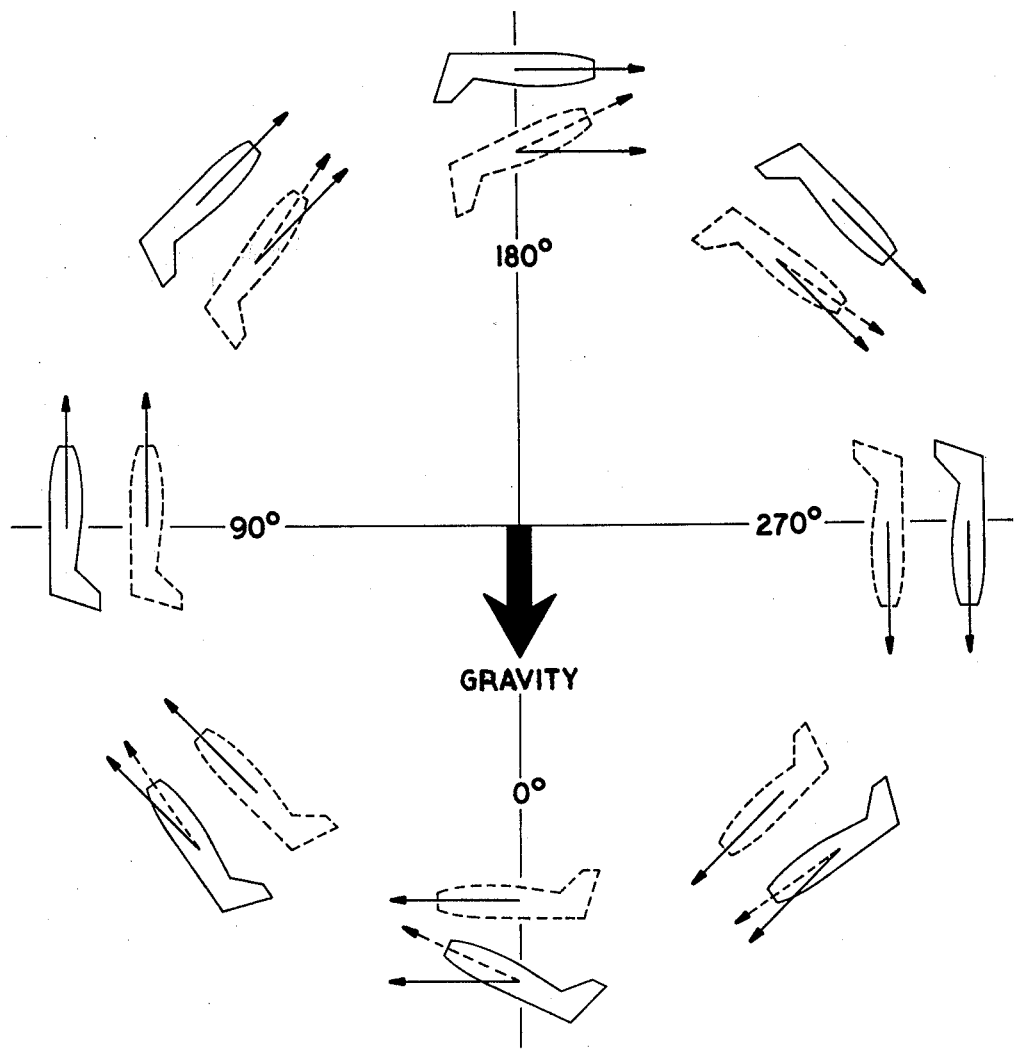
FIGURE 3 is a schematic diagram showing a comparison between the longitudinal axis of an unloaded airplane and a loaded airplane at various flight attitudes from 0° to 315°, the unloaded airplane being shown in dot-dash lines.

It will be noted from new FIGURE 3, that in level flight, the longitudinal axis of the loaded airplane is sloped relative to the nominal direction of flight.

On a vertical climb or dive at 90° and 270° the longitudinal axis of the airplane coincides with the nominal direction of flight.

At various intermediate attitudes, shown as 45°, 135°, 225° and 315° in FIGURE 3, there is an angular variation between the nominal direction of flight and the longitudinal axis of the loaded aircraft.

Curve 30 as shown in FIG. 2 is a plot of the slope of curve 31.

For the same circuit, when the bias is adjusted by control transformer 20 to be zero at 90 degrees of null and the signal is amplified, the desired correction curve 31 is achieved. In this correction curve the preset zero bias at 90 degrees and 270° is necessarily achieved and the curve is essentially a cosine curve. Thus, its maximum is at approximately zero degrees and 180° as required for appropriate correction of the pitch angle error.

Thus, in accordance with the invention, the use of a bias for the pitch control transformer 15 of the servo indicator derived from an amplified signal from the voltage drop across the resistance in the stator circuit connection of control transmitter 13 and control transformer 15 causes appropriate correction of pitch angle errors with a circuit which is relatively inexpensive and adds very little extra weight to the system.

Although we have described preferred embodiments of our novel invention, many variations and modifications will now be obvious to those skilled in the art, and we prefer therefore to be limited not by the specific disclosure herein but only by the appended claims.

What is claimed is:
1. A biasing circuit for a servo system; said servo system including a control transmitter having a rotor winding and stator windings and a control transformer having a rotor winding and stator windings; said stator windings of said control transmitter being electrically connected to respective stator windings of said control transformer; said rotor winding of said control transmitter having a voltage source connected thereto; said rotor winding of said control transformer being connected to an output circuit and delivering a voltage to said output circuit dependent upon the position of said rotor winding of said control transmitter; said biasing circuit including resistor means connected in series with the said electrical connection between one of said stator windings of said control transmitter and the said respective stator winding of said control transformer, and elec- trical connections connecting a voltage controlled by the voltage drop on said resistor in series with said rotor winding of said control transformer and said output circuit.

2. In a pitch control circuit for an all attitude circuit; a biasing circuit for generating a sinusoidal correction signal to correct for unbalanced loading; said pitch control circuit including a servo system; said servo system including a control transmitter having a rotor winding and stator windings and a control transformer having a rotor winding and stator windings; said stator windings of said control transmitter being electrically connected to respective stator windings of said control transformer; said rotor winding of said control transmitter having a voltage source connected thereto; said rotor winding of said control transformer being connected to an output circuit and delivering a voltage to said output circuit dependent upon the rotational angular position of said rotor winding of said control transmitter; said biasing circuit including resistor means connected in series with the said electrical connection between one of said stator windings of said control transmitter and the said respective stator winding of said control transformer, and electrical connections connecting a voltage controlled by the voltage drop on said resistor in series with said rotor winding of said control transformer and said output circuit.

3. A correction circuit for generating a sinusoidal correction voltage in a servo system having a first and second electrically connected stator winding of a first and second respective servo device; said correction circuit including a resistor connected in the circuit forming said electrical connection between said first and second stator windings; each of said first and second servo devices having respective rotor windings; a voltage controlled by the voltage drop across said resistor being operatively connected in series with one of said rotor windings by circuit connecting means, said circuit connecting means including an amplifier.

4. In a pitch control circuit for an all attitude circuit; a biasing circuit for generating a sinusoidal correction signal to correct for unbalanced loading; said pitch control circuit including a servo system; said servo system including a control transmitter having a rotor winding and stator windings and a control transformer having a rotor winding and stator windings; said stator windings of said control transmitter being electrically connected to respective stator windings of said control transformer; said rotor winding of said control transmitter having a voltage source connected thereto; said rotor winding of said control transformer being connected to an output circuit and delivering a voltage to said output circuit dependent upon the rotational angular position of said rotor winding of said control transmitter; said biasing circuit including resistor means connected in series with the said electrical connection between one of said stator windings of said control transmitter and the said respective stator winding of said control transformer, and electrical connections connecting a voltage controlled by the voltage drop on said resistor in series with said rotor winding of said control transformer and said output circuit; said circuit connecting means including amplifier means for controlling the magnitude of the correcting voltage.

5. In a pitch control circuit for an all attitude circuit; a biasing circuit for generating a sinusoidal correction signal to correct for unbalanced loading; said pitch control circuit including a servo system; said servo system including a control transmitter having a rotor winding and stator windings and a control transformer having a rotor winding and stator windings; said stator windings of said control transmitter being electrically connected to respective stator windings of said control transformer; said rotor winding of said control transmitter having a voltage source connected thereto; said rotor winding of said control transformer being connected to an output circuit and delivering a voltage to said output circuit dependent upon the rotational angular position of said rotor winding of said control transmitter; said biasing circuit including resistor means connected in series with the said electrical connection between one of said stator windings of said control transmitter and the said respective stator winding of said control transformer, and electrical connections connecting a voltage controlled by the voltage drop on said resistor in series with said rotor winding of said control transformer and said output circuit; said electrical connecting means including amplifier means for controlling the magnitude of the correcting voltage; said amplifier means including an auxiliary control transmitter; said resistor being connected in series with a first and second stator winding of said auxiliary control transmitter; the rotor winding of said auxiliary control transmitter being connected in series with said rotor winding of said control transformer.

6. A correction circuit for generating a sinusoidal correction voltage in a servo system having a first and second electrically connected stator winding of a first and second respective servo device; said correction circuit including a resistor connected in the circuit forming said electrical connection between said first and second stator windings; each of said first and second servo devices having respective rotor windings; a voltage controlled by the voltage drop across said resistor being operatively connected in series with one of said rotor windings by circuit connecting means; said circuit connecting means including amplifier means for controlling the magnitude of the correcting voltage; said amplifier means including an auxiliary servo means having a rotor and a first and second stator winding; said resistor being connected in series with said first and second stator windings; the rotor winding of said auxiliary servo means being connected in series with said one of said rotor windings of said second servo device.

No references cited.